US 7,792,713 B1
Sep. 7, 2010

(12) United States Patent
Kinney, Jr. et al.

(54) METHOD AND SYSTEM FOR DISGUISED PRICE BIDDING IN ONLINE AUCTIONS

(75) Inventors: Sam E. Kinney, Jr., Sewickley, PA (US); Robert G. Stevens, Tokyo (JP); John P. Levis, III, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 09/490,868

(22) Filed: Jan. 24, 2000

(51) Int. Cl.
G06Q 40/00 (2006.01)

(52) U.S. Cl. .............................. 705/35; 705/37; 705/42; 705/1

(58) Field of Classification Search .................. 705/37, 705/42, 1, 35
See application file for complete search history.

(56) References Cited

U.S. PATENT DOCUMENTS

| | | | | |
|---|---|---|---|---|
| 3,581,072 A | 5/1971 | Nymeyer | ..................... | 235/152 |
| 3,863,060 A | 1/1975 | Rode et al. | | |
| 4,597,045 A | 6/1986 | Kiuchi | | |
| 4,674,044 A | 6/1987 | Kalmus et al. | .............. | 364/408 |
| 4,789,928 A | 12/1988 | Fujisaki | ...................... | 364/401 |
| 4,799,156 A | 1/1989 | Shavit et al. | | |
| 4,842,275 A | 6/1989 | Tsatskin | | |
| 4,845,625 A | 7/1989 | Stannard | ..................... | 364/407 |
| 4,992,940 A | 2/1991 | Dworkin | ..................... | 364/401 |
| 5,136,501 A | 8/1992 | Silverman et al. | ........... | 364/408 |
| 5,193,056 A | 3/1993 | Boes | .......................... | 364/408 |
| 5,243,515 A | 9/1993 | Lee | ............................. | 364/401 |
| 5,297,032 A | 3/1994 | Trojan et al. | ................ | 364/408 |
| 5,375,055 A | 12/1994 | Togher et al. | ............... | 364/408 |
| 5,394,324 A | 2/1995 | Clearwater | ................... | 364/402 |
| 5,402,336 A | 3/1995 | Spiegelhoff et al. | ......... | 364/401 |
| 5,606,602 A | 2/1997 | Johnson et al. | ............. | 379/115 |
| 5,629,982 A | 5/1997 | Micali | | |
| 5,640,569 A | 6/1997 | Miller et al. | | |
| 5,664,115 A | 9/1997 | Fraser | ......................... | 705/37 |
| 5,684,963 A | 11/1997 | Clement | ..................... | 395/226 |
| 5,689,652 A | 11/1997 | Lupien et al. | ............... | 395/237 |
| 5,715,402 A | 2/1998 | Popolo | ....................... | 395/237 |
| 5,721,735 A | 2/1998 | Smiroldo | | |
| 5,727,165 A | 3/1998 | Ordish et al. | ............... | 395/237 |
| 5,758,327 A | 5/1998 | Gardner et al. | ................ | 705/26 |
| 5,758,328 A | 5/1998 | Giovannoli | .................. | 705/26 |
| 5,765,138 A | 6/1998 | Aycock et al. | ................. | 705/7 |

(Continued)

FOREIGN PATENT DOCUMENTS

CA 2069955 6/1991

(Continued)

OTHER PUBLICATIONS

Malone et al., "The Logic of Electronic Markets", *Harvard Business Review*, No. 893II (May-Jun. 1989).

(Continued)

*Primary Examiner*—Daniel S Felten
(74) *Attorney, Agent, or Firm*—Van Pelt, Yi & James LLP (57) ABSTRACT

A method and system for conducting electronic online auctions having disguised bidding is disclosed. Submitted bids are ordered on a basis of a comparative bid parameter used by an originator of an auction. The ordinal rank of a bid is reported to the bidder.

32 Claims, 6 Drawing Sheets

U.S. PATENT DOCUMENTS

| | | | |
|---|---|---|---|
| 5,774,873 A | 6/1998 | Berent et al. | 705/26 |
| 5,794,207 A | 8/1998 | Walker et al. | 705/23 |
| 5,794,219 A | 8/1998 | Brown | 705/37 |
| 5,797,127 A | 8/1998 | Walker et al. | 705/5 |
| 5,799,151 A | 8/1998 | Hoffer | 395/200.34 |
| 5,799,285 A | 8/1998 | Klingman | |
| 5,802,502 A | 9/1998 | Gell et al. | 705/37 |
| 5,803,500 A | 9/1998 | Mossberg | |
| 5,809,483 A | 9/1998 | Broka et al. | |
| 5,826,244 A | 10/1998 | Huberman | 705/37 |
| 5,832,496 A | 11/1998 | Anand | |
| 5,835,896 A * | 11/1998 | Fisher et al. | 705/37 |
| 5,862,223 A | 1/1999 | Walker et al. | |
| 5,890,138 A | 3/1999 | Godin et al. | |
| 5,897,621 A | 4/1999 | Boesch et al. | |
| 5,905,974 A | 5/1999 | Fraser et al. | |
| 5,905,975 A | 5/1999 | Ausubel | |
| 5,915,209 A | 6/1999 | Lawrence | |
| 5,966,699 A | 10/1999 | Zandi | |
| 6,014,627 A * | 1/2000 | Togher et al. | 705/1 |
| 6,021,398 A | 2/2000 | Ausubel | |
| 6,023,685 A * | 2/2000 | Brett et al. | 705/37 |
| 6,026,383 A | 2/2000 | Ausubel | |
| 6,044,363 A | 3/2000 | Mori et al. | |
| 6,055,518 A | 4/2000 | Franklin et al. | |
| 6,058,379 A | 5/2000 | Odom et al. | |
| 6,061,663 A | 5/2000 | Bloom et al. | |
| 6,078,906 A | 6/2000 | Huberman | 705/37 |
| 6,119,229 A * | 9/2000 | Martinez et al. | 713/200 |
| 6,151,589 A | 11/2000 | Aggarwal et al. | |
| 6,161,099 A | 12/2000 | Harrington et al. | |
| 6,199,050 B1 * | 3/2001 | Alaia et al. | 705/37 |
| 6,216,114 B1 | 4/2001 | Alaia et al. | 705/37 |
| 6,223,167 B1 | 4/2001 | Alaia et al. | 705/37 |
| 6,230,146 B1 | 5/2001 | Alaia et al. | 705/37 |
| 6,230,147 B1 | 5/2001 | Alaia et al. | 705/37 |
| 6,243,691 B1 | 6/2001 | Fisher et al. | |
| 6,266,652 B1 | 7/2001 | Godin et al. | |
| 6,285,989 B1 | 9/2001 | Shoham | 705/37 |
| 6,366,891 B1 | 4/2002 | Feinberg | |
| 6,401,080 B1 | 6/2002 | Bigus et al. | |
| 6,408,283 B1 | 6/2002 | Alaia et al. | |
| 6,415,269 B1 | 7/2002 | Dinwoodie | |
| 6,647,373 B1 * | 11/2003 | Carlton-Foss | 705/37 |

FOREIGN PATENT DOCUMENTS

| | | |
|---|---|---|
| CA | 2080452 | 5/1993 |
| CA | 2298 481 | 9/1998 |
| EP | 0 399 850 A | 11/1990 |
| EP | 0399850 A2 * | 11/1990 |
| JP | 409101994 A1 | 4/1997 |
| JP | 4100789992 A | 3/1998 |
| WO | WO 92/15174 | 9/1992 |
| WO | 97/37315 | 10/1997 |
| WO | WO 98/34187 A1 | 8/1998 |
| WO | WO 99/63461 | 12/1999 |
| WO | WO 00/17797 | 3/2000 |
| WO | WO 00/79463 A1 | 12/2000 |
| WO | WO 01/54040 A1 | 7/2001 |

OTHER PUBLICATIONS

Freemarkets™ Online, "Bidware Manual" (Jun. 9, 1988).
Freemarkets Online™, "Online Industrial Market Making, An Overview of Purchasing Executives".
WebAuction.com, "How to Play" (1998).
Auction Sales, "Live Auctions Online" (Sep. 1998).
Auction Port, "Online Auction Community—New Auctions Since Sep. 2, 1998" (Jul. 1998).
OnSale, "How to Play" (1998).
u-Auction-It™ (1997).
Freemarkets Online™, "Homepage" (1998).
Andrews, "Auctions Catch the Interest of Hobbyists and Big Business", Aug. 24, 1998.
Associated Press, "Auction on Web is Buyer's Market", Apr. 6, 1998.
Steinert-Threlkeld, "New Watchwords: Let Sellers Beware", Jun. 1, 1998.
Woolley, "E-muscle", Mar. 9, 1998.
Associated Press, "FreeMarkets Takes Auction on Internet", Feb. 23, 1998.
Jahnke, "How Bazaar" (Aug. 27, 1998).
Wilder, "What's Your Bid?—FreeMarkets' real-time online bidding technology lets clients drive down costs and improve product value", Nov. 10, 1997, *InformationWeek*.
Jean-Pierre Banatre, et al., "The Design and Building of Enchere, a Distributed Electronic Marketing System" Communications of the ACM, No. 1 (Jan. 29, 1986).
Danny Cohen, "Computerized Commerce" Information Processing 89 (Aug. 28-Sep. 1, 1989).
J. Sairamesh, et al., "Economic Framework for Pricing and Charging in Digital Libraries," D-Lib Magazine, ISSN 1082-9873 (Feb. 1996).
Todd E. Rockoff and Michael Groves, "Design of an Internet-based system for remote Dutch auctions," Internet Research: Electronic Networking Applications and Policy, vol. 5, No. 4, pp. 10-16 (1995).
Online Bidding Software, Electronic Buyers' News, Issue No. 1072, p. 86, 1/6p (Aug. 25, 1997).
"FairMarket Launches New Self-Serve Auctions," Business Wire, p6161495 (Jun. 16, 1998).
"Broadvision Developing First Interactive Commerce Management System to Suporrt Online Sales & Marketing Process; New Software Category Necessary to Interactive Network Architecture," Business Wire, p. 5150152 (May 15, 1995).
Lee, Ho Geun, "Do electronic marketplaces lower the price of goods/" Communications of the PCM, V. 41, No. 1, pp. 73-80 (Jan. 1998).
"Sold!. . . To the Lowest Bidder," Computer Finance, vol. 6, No. 2 (Jul. 1995).
"Venture Capitalists Fund Two Massachusetts Internet Related Companies," Boston Globe (Jan. 14, 1998).
Von det Fehr, et al., "Predatory bidding in Sequential Auctions," Oxford Economic Papers, vol. 46, No. 3, p. 345(12) (Jul. 1994).
"Moai Technologies Introduces New Categories of Business to Business Auction Software," Business Editors and Computer Writers (Mar. 16, 1998).
Kikuchi, et al., "Multi-Round Anonymous Auction Protocols," IEICE Trans. Inf. & Syst., vol. E82-D, No. 4 (Apr. 1999).
Vigoroso, "Buyers prepare for brave new World of E-Commerce," Purchasing, vol. 126, No. 6, p. S4(1) (Apr. 22, 1999).
"What you need to know to bid in FCC's Narrowband Auction," Washington Telecom News, vol. 2, No. 26, p. 6(2) (Jun. 27, 1994).
Fox, "The Calm Way of Buying and Selling Livestock," Sydney Morning Herald (Oct. 1988).
"SHOPPERSUNIVERSE," (Aug. 27, 1996).
Jackson, "FCC Charges for Online Bidding," Government Computer News (Jan. 27, 1997).
"Ingram Micro Launches Real-Time ON-Line Auction Site," PR Newswire (Feb. 11, 1998).
"Adauction.com Boosts Revenue with Enhanced Ad Auction" Format; Morning and Afternoon "Auctions" and "AutoExtend" Feature Maximize Opportunistic Media Buying on the Web, Business Wire (May 4, 1998).
Woods, "Excite Calls Online Auctions," Newsbytes News Network (Jun. 10, 1998).
"Internet: Excite Going Once, Twice, Three Times to Auction," Network Briefing (Jun. 11, 1998).
Kumar, et al., "Internet Auctions," Third USENIX Workshop on Electronic Commerce Proceedings, p. 49 (Aug. 31-Sep. 3, 1998).
M. Reck, "Types of Electronic Auctions," Hochschule St. Gallen.
C. Wrigley, "Design Criteria for Electronic Market Servers," Electronic Markets, vol. 7, No. 4 (1997).
"Shawmut National Will Auction $46 Million in Commercial Real Estate in December," Business Wire, Business Editors (Nov. 3, 1992).

Wurman et al., "The Michigan Internet AuctionBot: A Configurable Auction Server for Human and Software Agents," Artificial Intelligence Laboratory, University of Michigan (1998).

Buyer's Auction Online, http://buyersauction.com/userinfo.htm (1998).

Keith Ervin, "Three Tree Point Property Draws 1.5 Million Bid," Seattle Times (Feb. 11, 1998).

* cited by examiner

Fig. 1

|  | Coordinator | Buyer | Supplier |
|---|---|---|---|
| Initial Contact 102 | Contact buyer | Provide Data |  |
| RFQ 104 | Collect & Administer RFQ Data | Provide RFQ Data |  |
|  | Publish & Administer RFQ |  | Access RFQ |
|  | Manage RFQ Response |  | Respond to RFQ |
| Auction Administration 106 |  | Request Auction |  |
|  | Coordinate & Administer Auction Setup |  |  |
|  | Assist & Administer User Auction Prep |  | Prepare for Auction |
| Conduct Auction 108 | Assist & Administer Auction | Observe | Bid |
| Administer Auction Results 110 | Analyze & Administer Auction Results | View Auction Results | View Auction Results |
| Contract Administration 112 |  | Settlement | Settlement |

METHOD AND SYSTEM FOR DISGUISED PRICE BIDDING IN ONLINE AUCTIONS

REFERENCE TO RELATED APPLICATIONS

This application is a continuation-in-part of copending U.S. application Ser. No. 09/311,555, now U.S. Pat. No. 6,230,147, entitled "METHOD AND SYSTEM FOR CONTROLLING AN ELECTRONIC AUCTION DURING THE TRANSITION TO A CLOSED STATE," filed May 14, 1999, which is a divisional of U.S. application Ser. No. 09/252,790, now U.S. Pat. No. 6,230,146, filed Feb. 19, 1999, which claims priority to U.S. Provisional Application No. 60/101, 141, filed Sep. 18, 1998, and U.S. Provisional Application No. 60/110,846, filed Dec. 4, 1998.

BACKGROUND OF THE INVENTION

The disclosed invention relates generally to conducting online electronic auctions, and in particular to online electronic auctions featuring partial quantity evaluated rank bidding.

Traditional Procurement Models

Procurement of supplies traditionally has involved high transaction costs, especially information search costs. The introduction of electronic commerce introduced new methods of procurement that lower some of the transaction costs associated with procurement. Online procurement, or business-to-business electronic commerce, matches buyers and suppliers so that transactions can is take place electronically. There are three models for online procurement: catalog, buyer-bidding auction, and supplier-bidding auction.

The "catalog" model of online procurement was the first to be developed. The first electronic catalogs were developed by suppliers to help customers obtain information about products and order supplies electronically. These first electronic catalogs were single-source; i.e., they only allowed customers to obtain information and products from that supplier.

However, customers typically are not satisfied with being "locked in" to one supplier—they want to be able to compare a number of competing products to be sure of getting the product features they want, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services compiled a database that lists all suppliers of airplane parts that have a certain item in stock. Potential buyers dial into the database to get information on the parts they need. Therefore, a third party, Inventory Locator Service, not a supplier, creates the unbiased electronic market.

The electronic catalog model of electronic commerce involves one buyer and one supplier at a time. When many buyers compete for the right to buy a standard product or service, a buyer-bidding auction model is created. A noteworthy example of the buyer-bidding auction model is the system operated by PriceLine.com and described in U.S. Pat. No. 5,794,207 issued to Walker et al. In this system, a potential buyer competes with other potential buyers for airline tickets by submitting a bid for an airline ticket on the PriceLine website. An airline can choose to accept a bid, thereby committing the buyer to buy the ticket.

The catalog and buyer-bidding auction types of electronic markets do not work in some situations, however. If the buyer requires a custom-made product, it is not possible for suppliers to publish a set in a catalog. Likewise, it is not possible for buyers to specify all of the details of the product they want to purchase in a buyer-bidding auction. Traditionally, when a company requires a custom industrial product, a buyer for the company searches for a potential supplier and acquires custom-tailored price quotes from a supplier for the needed custom product. The search is slow and somewhat random because it usually relies heavily on personal relationships. The costs associated with locating vendors, comparing their products, negotiating, and updating paperwork become big factors in a purchase decision. The cost of switching suppliers is very large, which means that the quoted price is probably not the lowest fair price and that it is difficult for a new supplier to enter the market.

As an alternative, buyers use auctions to save money. The assignee of the present application developed a system wherein suppliers downwardly bid against one another to achieve the lowest market price in a supplier-bidding auction.

Supplier-Bidding Auction

In a supplier-bidding auction, bid prices typically start high and move downward in a reverse-auction format as suppliers interact to establish a closing price. The auction marketplace is one-sided, i.e. one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers typically do not purchase one component at a time. Rather, they purchase whole families of similar components. At times, components are strongly related to one another. As an example, a buyer might purchase a given plastic knob in two different colors, or might purchase a nameplate in four different languages. These parts are so similar that, by definition, they must be purchased from the same supplier—all of the knobs are made using the same mold. These items are therefore grouped into a single lot. Suppliers in industrial auctions must provide unit price quotes for all line items in a lot.

Auction Process

Figure 1:
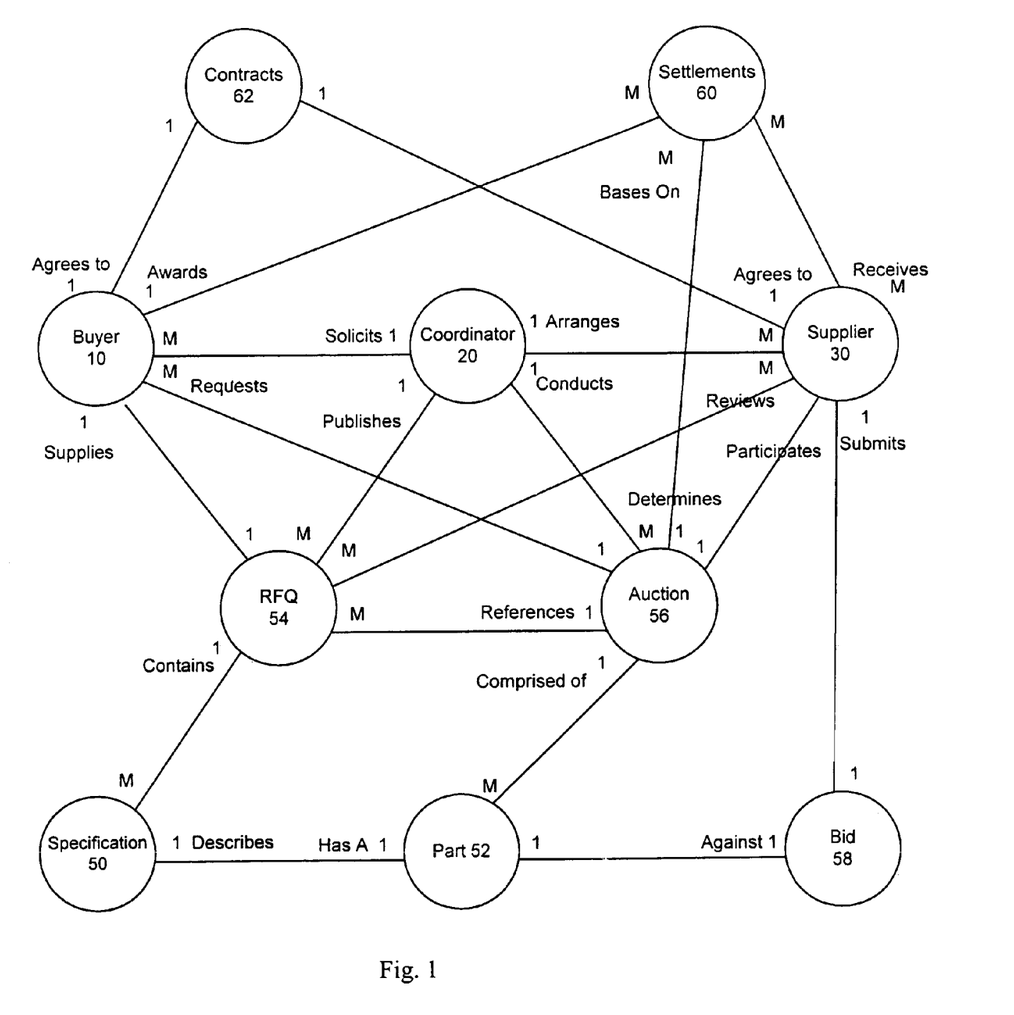
FIG. 1 illustrates the elements and entities involved in an auction process.

The process for a supplier-bidding auction is described below with reference to FIGS. 1 and 2. FIG. 1 illustrates the functional elements and entities in a supplier-bidding auction, while FIG. 2 is a process diagram that identifies the tasks performed by each of the involved entities.

The supplier-bidding auction model requires that buyer 10 to define the bidding product or service. An auction coordinator 20 works with buyer 10 to prepare for and conduct an auction and to define the potentially new supply relationships resulting from the auction.

Figure 2:
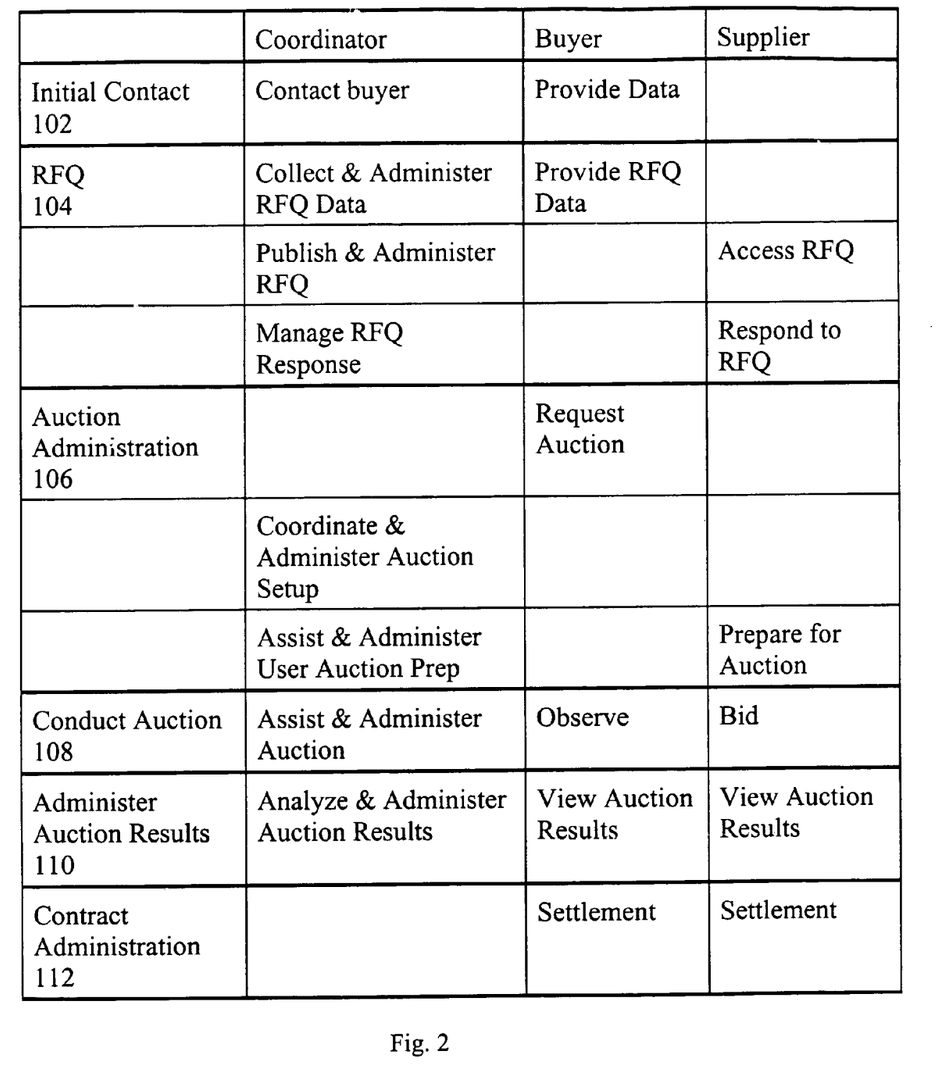
FIG. 2 illustrates the tasks performed by the entities involved in an auction process.

As shown in FIG. 2, in the Initial Contact phase 102 of the auction process, the coordinator 20 contacts the buyer 10, and the buyer 10 provides data to the coordinator 20. The coordinator 20 prepares a specification 50 for each desired product or part 52. Once the product 52 is defined, potential suppliers 30 for the product are identified. The coordinator 20 and buyer 10 work together to compile this list of potential suppliers from suppliers already known to the buyer 10 as well as suppliers recommended by the coordinator 20.

The buyer 10 makes a decision regarding which potential suppliers 30 will receive invitations to the upcoming Auction. Suppliers 30 that accept Auction invitations are then sent notices regarding the upcoming Auction, as well as client software to install in preparation of participating in the Auction.

In the RFQ phase 104, the coordinator 20 works with the buyer 10 to prepare a Request for Quotation ("RFQ") 54. The coordinator 20 collects and maintains the RFQ data provided by buyer 10, and then publishes the RFQ 54, and manages the published RFQ 54. The RFQ 54 includes specifications 50 for all of the parts 52 covered by the RFQ 54. In the RFQ 54, buyer 10 aggregates similar part or commodity line items into job "lots." These lots allow suppliers 30 to bid on that portion of the business for which they are best suited.

During the auction 56, bids 58 will be taken against individual lots (and their constituent parts 52) within RFQ 54. While suppliers 30 must submit actual unit prices for all line items, the competition in an Auction is based on the aggregate value bid for lots. The aggregate value bid for a lot depends upon the level and mix of line item bids and the quantity for each line item. Therefore, suppliers 30 submit bids at the line item level, but compete on the lot level.

In the Auction Administration phase 106, coordinator 20 coordinates the Auction and administers the Auction setup and preparation. The coordinator 20 sends RFQ 54 to each participating supplier 30, and assists participating suppliers 30 with preparation for the Auction.

In the Auction phase 108, suppliers 30 submit bids 58 on the lots and monitor the progress of the bidding by the participating suppliers 30. The coordinator 20 assists, observes, and administers the Auction.

When the bidding period is over, the auction enters the Auction Results Administration phase 110. In this phase, coordinator 20 analyzes and administers the Auction results, which are viewed by buyer 10. The buyer 10 begins to conduct final qualification of the low bidding supplier(s). The buyer 10 retains the right not to award business to a low bidding supplier 30 based on final qualification results or other business concerns.

In the ensuing Contract Administration phase 112, the coordinator 20 facilitates settlements 60 awarded by the buyer 10 to suppliers 30. Contracts 52 are then drawn up between buyer 10 and suppliers 30.

Communications and Software

Figure 3:
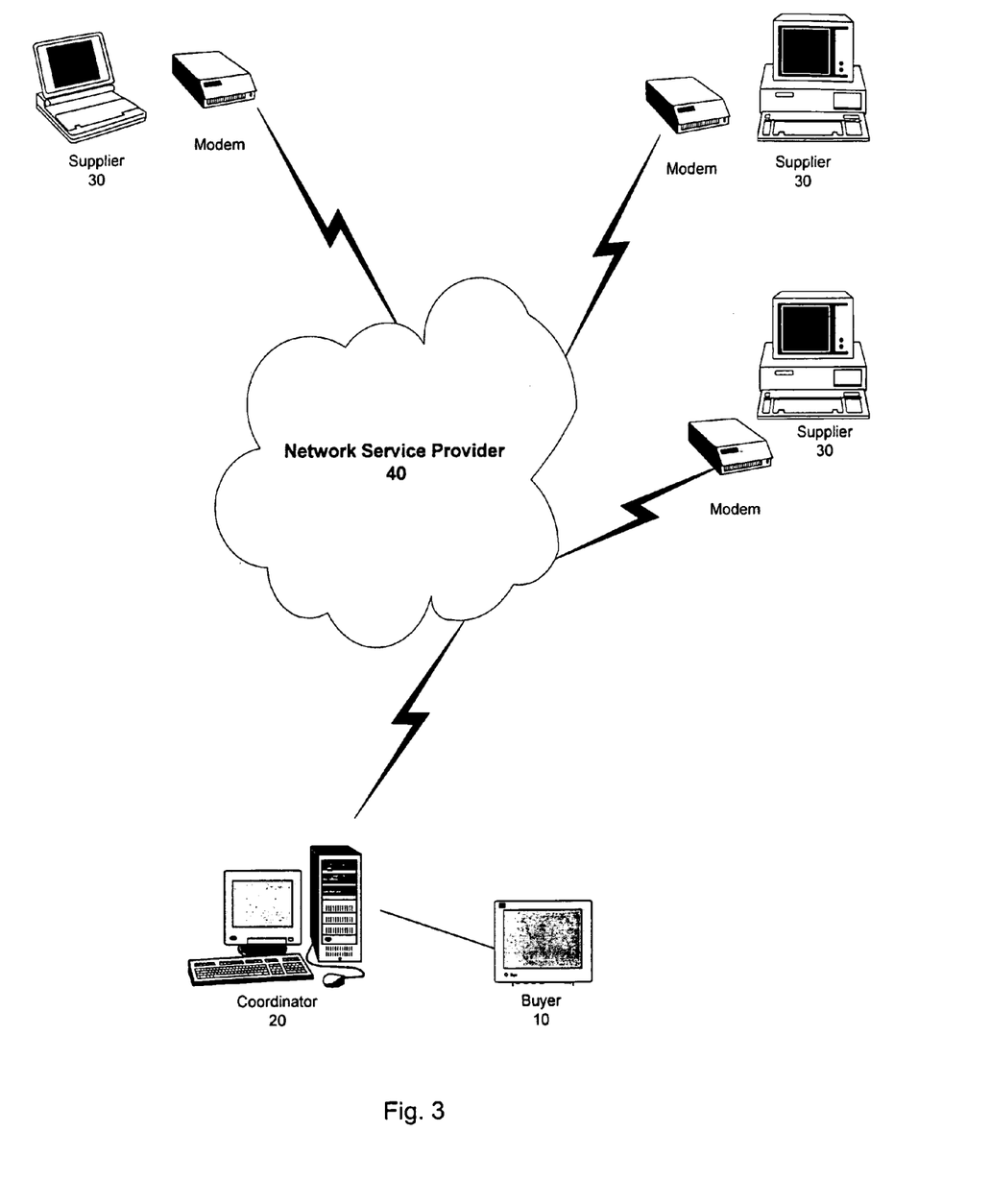
FIG. 3 illustrates the communications links between the coordinator and the potential suppliers in an auction.
Figure 4:
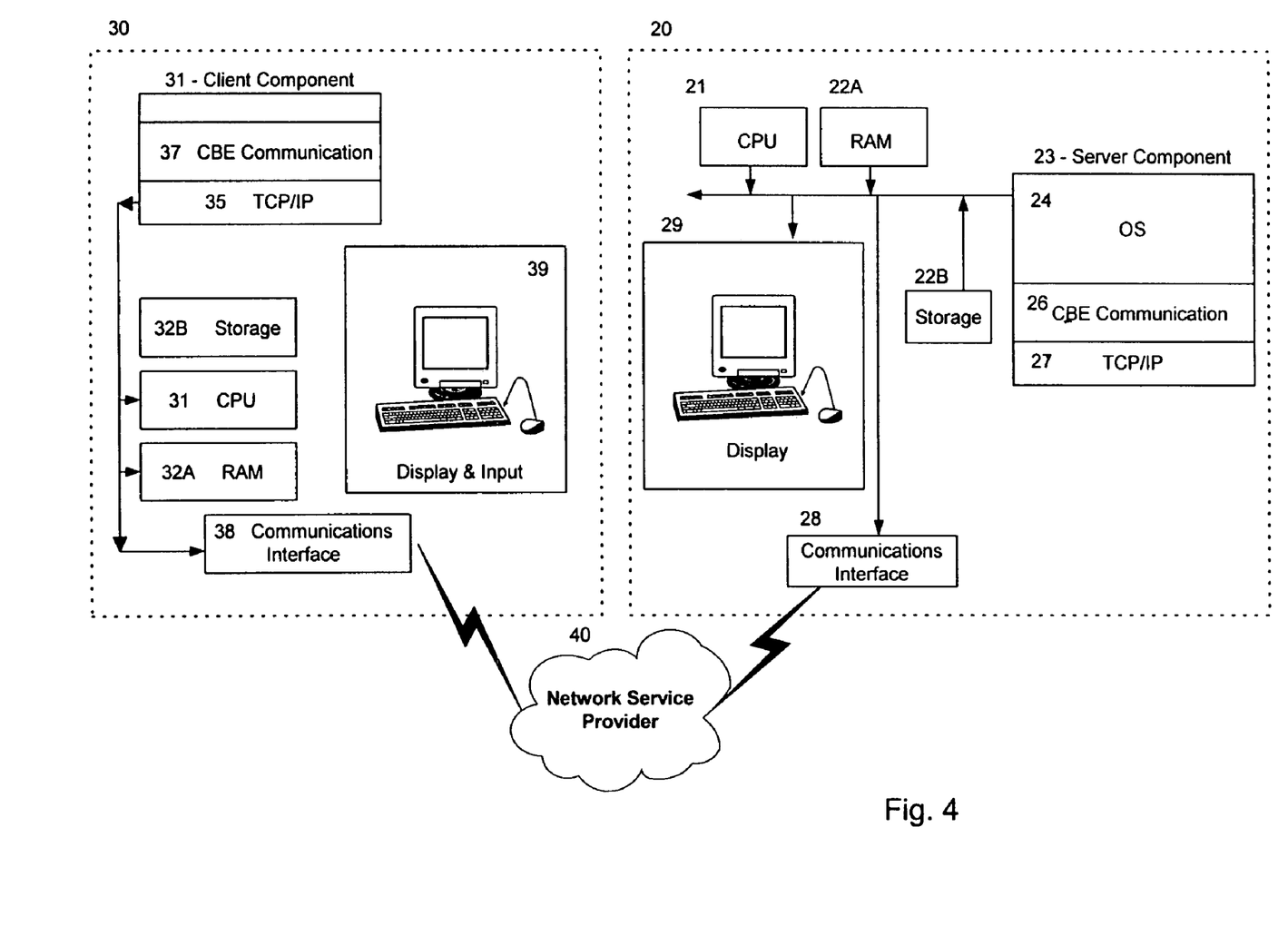
FIG. 4 illustrates the client and server components of the computer software application that conducts the auction and the hardware at the sites of the coordinator and the potential suppliers on which the client and server components operate.

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider 40 accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. Suppliers 30 make bids during the Auction using the client component 31. The bids are sent via the network service provider 40 to the site of the coordinator, where it is received by the server component 23 of the software application. The client component 31 includes software used to make a connection through telephone lines or the Internet to the server component 23. Bids 58 are submitted over this connection and updates are sent to connected suppliers.

Bids 58 can only be submitted using the client component 31 of the application—this ensures that buyers do not circumvent the bidding process, and that only invited suppliers participate in the bidding. Typically, bidders can see their bids and bids placed by other suppliers for each lot on the client component 31. When a bidder submits a bid, that bid is sent to the server component 23 and evaluated to determine whether the bid is from an authorized bidder, and whether the bid has exceeded a pre-determined maximum acceptable price. In a typical online auction, bids placed by a supplier-bidder are broadcast to all connected bidders thereby enabling every participating bidder to see quickly the change in market conditions and begin planning their competitive responses.

Auction Dynamics

Online electronic auctions provide a powerful interactive medium for creating and capitalizing upon traditional auction dynamics. The extensive reach is of online electronic auctions combined with inherent forms of anonymity make it an attractive choice for virtually any auction sale. Online electronic auctions enable potential bidders to view a rapidly changing auction landscape as hundreds of bids can easily be processed within a few hours.

A conventional online auction will typically display the then-current low bid in the market to all participants in the auction, even those participants who have not submitted bids, or those participants whose bids are far different than the market-leading bid. Conventional online auctions typically rely on the interaction between bidders that results from disclosing bids to drive the auction to the best possible bids. In circumstances where buyers have many potential suppliers, and suppliers are unlikely to be known to one another, displaying this information will stimulate the auctioning process.

However, displaying all bids to all auction participants, including the market-leading bid, may not be advantageous to the buyer in many situations.

One potential disadvantage of an auction that discloses bid values is the possibility of a leak. If all auction participants can view the market-leading bid, then a supplier could potentially leak this information to other buyers or to the news media or trade press. The effect of such a leak may induce a general reduction in market prices, which would confer the benefit of the auction to all buyers in the industry, thereby eliminating any advantage the buyer obtains from using the online auction.

For the same general reasons, suppliers may not want their bids disclosed to other suppliers. If the disclosure of prices from a single auction were to have the effect of reducing market prices for all similar products, suppliers would be reluctant to participate in the auction, or would be less aggressive in their participation in the auction.

In addition, traditional online auctions have not been appropriate for some industries because of the nature of the auction. Under certain market conditions, it has been advantageous for a buyer to conduct sealed bidding rather than online auctions, because sealed bidding has the benefit of hiding from the other bidders the value of the winning bid. This is helpful in circumstances where suppliers are known to collude with other suppliers or publish prices through trade publications.

Classical economic theory about the behavior of cartels suggests cartel members have the incentive to "cheat" or break ranks with the cartel when other cartel members cannot catch the offending member. A sealed bidding auction, or disguised price auction, facilitates a cartel member's ability to break ranks with the cartel, because other cartel members do not know the value of the winning bid. This feature of a sealed bidding auction frequently works to the buyer's benefit.

In traditional online auctions it has been hard to disguise the value of prices and prevent disclosure, while benefiting from the interactive dynamics of online auctions that typically result in lower prices for the buyer.

In addition, when bids are fully disclosed, bidding typically declines only marginally below than the "second best" prices offered in the market. Therefore, if the buyer expects the market-leading bid to be far lower than other bids, it can be to the buyer's advantage to prevent other bidders from seeing the market low bid. In classic auction theory, a low bidder tends to transfer more surplus to the buyer if the low bidder bids a greater spread below the second place bid. This can benefit buyers.

Therefore, under certain market conditions, it would be advantageous to conduct a "sealed bidding" online auction, where the value of the winning bid is hidden from other bidders.

SUMMARY OF THE INVENTION

These shortcomings and other limitations are obviated in accordance with the present invention by increasing the competitiveness within an auction by enabling the auction system to disguise the actual value of bids from bidders. This feature has the effect of allowing a market-leading bid that is far below the level of competing second or third place bids.

In the present invention, bidders only know the ordinal rank of their bids rather than the value of other bidder's bids. Competitive interaction occurs when is bids are received that change the ordinal rank, thereby inducing a competitive response. When a bid is received in system of the present invention, the ordinal rank of the bid is calculated. Ordinal ranks range from 1 representing the best bid, 2 representing the next best bid, to n representing the worst bid.

In the present invention, rather than displaying the value of the market-leading bid to all auction participants, only the ordinal rank of a bidder's bids are displayed back to that bidder. At any given time, bidders know the value of their own bids, and the rank order their bids have in the marketplace. If a bid is ranked #1, the bidder of the first-place bid knows the value of the market-leading bid, because his bid is the market-leading bid. However, the bidder of the first-place bid does not know how much better his bid is than the second-place bid. In addition, if a bid is ranked #2 or higher, the bidder has no way of inferring by how much the market-leading bid differs from his own bid.

As the auction progresses, changes in rank status can inform bidders of the relative price differences between their bids and bids of adjacent rank. The auction dynamics of the system of the present invention result in interactive experimentation where a bidder makes small changes in his bids until a change in rank is observed. The interaction only divulges information about competitors' bids that are near in price to one's own bids. Little or no information can be deduced about bids that differ greatly from one's own bids in either value or rank.

When calculating the ordinal rank of a bid, the system of the present invention may use a transformation process on a bid, or may convert bids from various currencies, before ranking the bids.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION

Reference will now be made in detail to the preferred embodiments of the present invention, examples of which are illustrated in the accompanying drawings. The present invention described below extends the functionality of the inventive electronic auction system and method described in greater detail in co-pending application Ser. No. 09/252,790, entitled "Method and System for Conducting Electronic Auctions," filed Feb. 19, 1999, the disclosure of which is hereby expressly incorporated in the present application.

The present invention obtains the benefit of both the interactivity of a traditional online auction and the secrecy of a sealed bid auction. In the online auction of the present invention, a bidder only knows his ordinal rank order rather than the value of the low market bid. Interaction occurs when bids are received that change the ordinal rank order, thereby inducing a competitive response.

In an interactive auction, bidders compete against each other as they react to bids submitted by their competitors. In a downward-price, supplier-bidding auction, this interaction stops when a bid is made that attracts no further lower bids. The auction tends to reach the "second best" price that a supplier might offer, as described in co-pending application Ser. No. 09/490,867, entitled "Method and System for Correcting Market Failures with Participant Isolation in Dutch Style Online Auctions", filed Jan. 24, 2000, the disclosure of which is hereby expressly incorporated into the present application.

When prices are fully disclosed, pricing is expected to decline to only marginally lower than the "second best" price offered in the market, with no further incentive to reduce prices far below the second best price. In other words, the last bid only goes as low as the second lowest bidder is willing to go. By disguising the values of bids in the present invention, a market-leading bid that is far below the level of a competing second or third place bid is possible.

For example, consider the following bidding scenarios in a traditional downward-price, supplier-bidding auction. As illustrated by the potential offerings in Table 1, each supplier A-D has a "walk-away" price (or floor) that defines lowest level of bid they are willing to make in the interactive bidding event, shown as Best Price in the Table.

TABLE 1

| Supplier | Scenario 1 Best Price | Scenario 2 Best Price |
|---|---|---|
| A | $10.05 | $10.05 |
| B | $10.00 | $10.00 |
| C | $9.98 | $9.15 |
| D | $10.06 | $10.06 |

In scenario 1, the suppliers interact until supplier B submits his final bid of $10.00. Supplier C can see that the current market-leading bid is $10.00, and counters at $9.99. No other seller can match supplier C's price and the market closes at $9.99. In this scenario, the buyer left $0.01 "on the table" since supplier C would have willingly bid $9.98. As the $0.01 differential is quite small, this outcome is reasonably acceptable.

However, in scenario 2, supplier C has a "walk-away" price of $9.15. During the auction, the suppliers again interact until supplier B submits his final bid of $10.00. Again, Supplier C sees that the market-leading bid is $10.00, and counters at $9.99. Supplier C has no incentive at this time to bid anything lower, although his walk-away price is still significantly below the market. As no other seller can match supper C's price, the market again closes at $9.99. In this scenario, the buyer left $0.84 "on the table" since supplier C would have willingly bid $9.15. This $0.84 differential is unacceptably large.

As these scenarios illustrate, traditional interactive auctions will consistently fail to extract most of the supplier surplus for the buyer.

While the present invention does not ensure that a supplier will bid his "walk-away" price, the limited disclosure feature of the present invention can have the effect of allowing a market-leading bid that is far below the level of competing second or third place bids. The present invention can help the buyer extract more of the supplier surplus.

In a traditional online auction, when a bid is submitted, that bid is transmitted back to all participants, and they see the exact amount of the bid. Typically, the dollar (or other currency) amount of the market-leading bid is displayed. In the present invention, on the other hand, when a bid is received the ordinal rank of the bid is calculated. Ordinal ranks range from 1 representing the best bid, 2 representing the next best bid, to n representing the worst bid. Bidders only see bid ranks, not bid amounts.

Typically, in the present invention a bidder may make more than one bid for a given lot, and amend his bids in response to competition. The ranking occurs at the bid level, by considering each bid individually, so that a bidder who has multiple bids submitted will have each bid separately ranked. For example, a bidder who has submitted two separate bids may have the one bid ranked #1, to and a second bid ranked #4.

In the present invention, rather than displaying the value of the market-leading bid to all auction participants, only the ordinal rank of a bidder's bids are displayed back to that bidder. At any given time, bidders know the value of their own bids, and the rank order their bids have in the marketplace. If a bid is ranked #1, the bidder knows the value of the market-leading bid, because his bid is the market-leading bid. However, if a bid is ranked #2 or higher, the bidder has no way of inferring by how much the market-leading bid differs from his own bid.

In a traditional auction, most of the bidding occurs in response to a low bid. A high percentage of bids, when submitted, are market-leading bids. However, in the present invention, because bidders are generally unaware of the level of the low market bid, many bids when submitted are in fact still behind the market. In the system of the present invention, bids are made in small price decrements (or increments) as bidders experiment until they witness a change in rank order.

Typically, many bidders may experiment with bids around the first-place bid. This may result in a "skirmish" for first-place as many bidders make small changes in bids in an attempt to take first-place. Bidders may skirmish around a higher ranking bid as well as the first-place bid. Frequently, low bidders are not automatically awarded business in online industrial auctions because of non-price factors, such as quality and location. Therefore, in many situations, bidders will actively skirmish around ranks other than #1.

The bidding behavior that results in the present invention is very interactive, as bidders successively lower their own prices in small amounts until they witness a change in rank order. At that point, the bidder has discovered the approximate value of one of the other bids in the market. In the case that a bid reduces its rank from #2 to #1, then that bidder has discovered the market-leading price level. At this point, the bidder whose bid had been ranked #1 now notices that his bid rank has moved to #2, and may respond by lowering his own bid.

Therefore, in the present invention, bidders typically "feel their way down" to the market by making many small steps so as not to inadvertently underbid. The effect of many bidders bidding simultaneously is that all bidders chase the market down.

To illustrate the features of the present invention, consider an auction shown in Table 2, which represents the user interface as seen from the perspective of one bidder. In this case, the bidder has two offerings against Lot 1, Bid 1-A and Bid 1-B. (Each successive bid can be tagged with a letter "A", "B" or higher to facilitate keeping track of different bids.) In this scenario, the bidder has only one offering against Lot 2, bid 2-A.

TABLE 2

| Scenario #3 | | | |
|---|---|---|---|
| Lot | Offering | Price | Rank |
| 1 | Bid 1-A | $10,000 | 3 |
| 1 | Bid 1-B | $15,000 | 5 |
| 2 | Bid 2-A | $50,000 | 1 |

For purposes of this illustration, assume the current market-leading bid on Lot 1 is $8,550, and the current second place bid on lot 1 is $9,000. As shown in Table 2, the bidder in this example is in third-place with a bid of $10,000. If the bidder in this example lowers his bid to $9,500, and no other bids are received, then the bidder's interface changes to reflect the new $9,500 bid. However, his rank does not change, as his bid is still greater than the second place bid of $9,000. This is shown in Table 3.

TABLE 3

| Lot | Offering | Price | Rank |
|---|---|---|---|
| 1 | Bid 1-A | $9,500 | 3 |
| 1 | Bid 1-B | $15,000 | 5 |
| 2 | Bid 2-A | $50,000 | 1 |

The system of the present invention accommodates tie bids. In one embodiment, ties are allowed and the user interface reflects that the rank ordering is a tie. In a second embodiment, the system rejects bids that would result in a tie, forcing the bidder to enter a different bid.

Assume for purposes of this example that ties are allowed, and that the bidder in the example makes a bid of $9,000. The interface changes as shown in Table 4 to reflect a tie at the second place rank. The change in Bid 1-A does not is change the rank of Bid 1-B, and it remains in fifth place. The bidder now knows the value of the second-place bid (his own), but does not know the value of the first-place bid.

TABLE 4

| Lot | Offering | Price | Rank |
| --- | --- | --- | --- |
| 1 | Bid 1-A | $9,000 | 2-tie |
| 1 | Bid 1-B | $15,000 | 5 |
| 2 | Bid 2-A | $50,000 | 1 |

The bidder in the example now bids $8,900, taking second place without a tie, as shown in Table 5. The bid formerly tied with this bid is bumped to third place, which is not shown here, but reflected on that bidder's user interface only.

TABLE 5

| Lot | Offering | Price | Rank |
| --- | --- | --- | --- |
| 1 | Bid 1-A | $8,900 | 2 |
| 1 | Bid 1-B | $15,000 | 5 |
| 2 | Bid 2-A | $50,000 | 1 |

In this example, the bidder then amends Bid 1-A to $8,800, $8,700 and then $8,600. In each case, the rank of Bid 1-A does not change, as all of these bids are still greater than the market-leading bid of $8,550. This is reflected in Table 6.

TABLE 6

| Lot | Offering | Price | Rank |
| --- | --- | --- | --- |
| 1 | Bid 1-A | $8,600 | 2 |
| 1 | Bid 1-B | $15,000 | 5 |
| 2 | Bid 2-A | $50,000 | 1 |

Only when the bidder lowers Bid 1-A to $8,500 does the rank order change. In this case, Bid 1-A of $8,500 is lower than the current market-leading bid of $8,550. Now Bid 1-A takes the lead, as is reflected in Table 7.

TABLE 7

| Lot | Offering | Price | Rank |
| --- | --- | --- | --- |
| 1 | Bid 1-A | $8,500 | 1 |
| 1 | Bid 1-B | $15,000 | 5 |
| 2 | Bid 2-A | $50,000 | 1 |

The user interface for the bidder who had the previously market-leading bid of $8,550 is updated to reflect this change, and assuming no other intervening bids have been made, that interface will show that the bid of $8,550 is now in second place. That bidder no longer knows the value of the market-leading bid. He only knows that his bid of $8,550 is now in second-place.

In the disguised ranked ordering process described above, the ranking is performed based upon submitted prices. These price comparisons are permissible if the bidders are bidding identical goods. In many auction markets, however, the quality of the goods offered may differ. This is especially true in the context of industrial auctions. In an industrial auction, suppliers are bidding to supply a buyer's requirement. Typically, while each supplier is expected to fabricate an offering of the same quality, in reality they provide items of somewhat different quality. Thus, for industrial purchasers, accepting bids from suppliers is problematic due to the differences in value. Generally, quality differences tend to make the playing field "unlevel"—taking away the buyer's ability to use price as the deciding factor. This situation reduces the attractiveness of online auctions to industrial buyers.

One example of such a market is the coal market. Coal is typically unique to the mine of origin. Coal can be characterized using measures such as thermal content, percentage sulfur, percentage ash, percentage water/moisture, hardness, etc. The uniqueness of the coal means that the value of a lot of coal is dictated by the various coal characteristics. Certain buyer requirements, such as the time frame of required delivery and the types of power generation units used by the buyer, can also affect the buyer's valuation of a lot of coal. In many cases, the buyer is ultimately interested in the price per unit energy produced when the coal is processed through their power generation unit.

In such markets, a uniform pricing mechanism enables various forms of coal, or other industrial products, to be compared by the buyer. Such a uniform pricing mechanism is enabled in the present invention through a transformation process. Prior to describing the application of the transformation process to the present invention, an example of the transformation process is explained in the context of a coal market interactive bidding event.

Typically, bids for coal are submitted on a price per physical measure of weight or volume (e.g. $/ton) basis. As noted, the raw $/ton bids of the participating suppliers cannot be readily compared to each other due at least in part to the underlying differences in the characteristics of the coal. Thus, a transformation process is needed to transform the $/ton bids for unique lots of coal into standardized units of value to the buyer (e.g. price-per-unit-of-energy bids such as cents/Million BTU or cents/KWH). After all of the $/ton bids are transformed into standardized units of value, the buyer can readily identify the market leading bids.

General transformation bidding is described in greater detail in co-pending application Ser. No. 09/282,157, entitled "Method and System for Conducting Electronic Auctions with Multi-Parameter Price Equalization Bidding," filed Mar. 31, 1999, the disclosure of which is hereby expressly incorporated in the present application.

Figure 5:
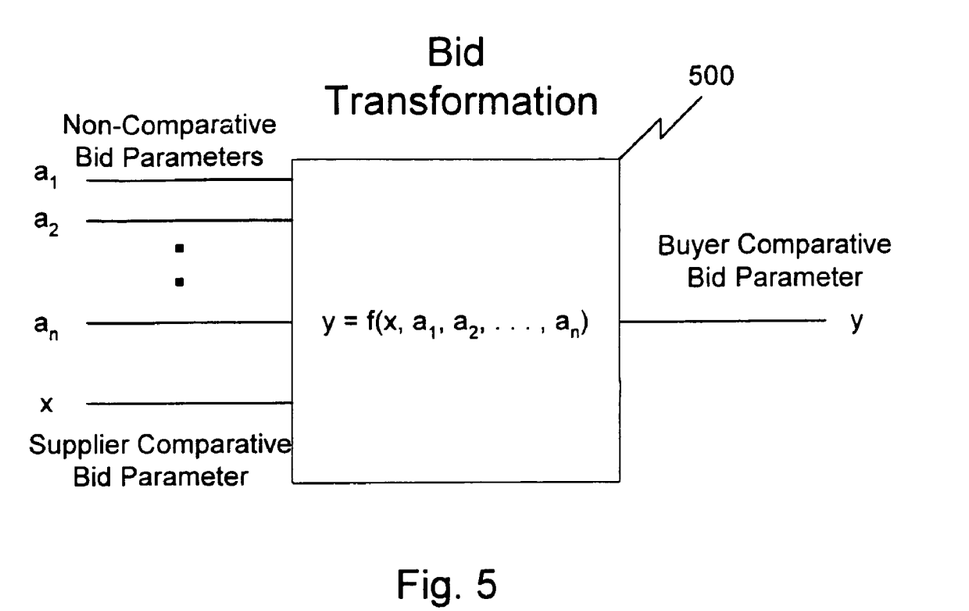
FIG. 5 illustrates a generic transformation function.

The general transformation mechanism is illustrated in FIG. 5. As illustrated, bid transformation 500 represents a function (f) that is operative on input variables (x) and ($a_1 \ldots a_n$). In the context of downward-price, supplier-bidding auctions, input variables ($a_1 \ldots a_n$) represent non-comparative bid parameters, while input variable (x) represents a supplier comparative bid parameter (e.g. price). The output of bid transformation 500 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In another embodiment, an optimization routine can be implemented to minimize the buyer's total cost. Rather than performing a linear, non-linear, or lookup table transformation of individual bids, the bids are evaluated together by an optimization program using linear programming or integer programming techniques.

In linear or integer programming, the value of an "objective function" is mathematically optimized (either maximized or minimized) subject to the rate of tradeoff between available resources and the constraints on the availability of those resources. Linear or integer program applications are useful for finding the mix of resources to feed into a manufacturing or conversion process to minimize the cost of that process. It should be noted that an objective function can be defined to be maximized or minimized. For example, an auction originator might choose to minimize cost or maximize profit.

Consider three types of coal having different specifications a, b, and c. In a simple linear transformation algorithm, the auction server would rank the coal types in order of their attractiveness. Assume that a linear transformation would find coal b to be the most attractive. An optimization algorithm can improve on that outcome. For example, the optimization algorithm may determine that some mix of coal a and c would in fact be more attractive than b alone. Optimization techniques, such as linear programming or integer programming, can be designed to find such a solution. Integer programs are used when the solution must be the best "whole number" combination. For example, in purchasing coal, a buyer wishes to buy in whole train car or barge load increments. Thus in an application like coal, an integer program might be preferred to a linear program, which can yield fractional solutions.

In the generic description of the transformation process in FIG. 5, two types of comparative bid parameters exist. A buyer comparative bid parameter (y) refers to a parameter, resulting from the transformation process, upon which the buyer will compare competing bids. A supplier comparative bid parameter (x), on the other hand, refers to an input to the transformation function (f).

As noted, non-comparative bid parameters also are used as inputs to the transformation process. Unlike supplier comparative bid parameters, non-comparative bid parameters (non-price parameters) are not directly used to compare competing bids.

In this transformation framework, a supplier comparative bid parameter value can be modified by the transformation process based upon non-comparative bid parameter values to yield a buyer comparative bid parameter value. Competition between bids is based on the relative magnitude of the values of the buyer comparative bid parameter associated with each of the bidders.

Where a single buyer comparative bid parameter (e.g. price) is output by the transformation process, competition between bids is based on the relative magnitude of the values of the buyer comparative bid parameter associated with each of the bidders.

In a downward-price, supplier-bidding interactive auction, suppliers submit bids interactively as the market leading bid trends downward towards the final auction price. Each of the submitted bids, originally defined in $/ton, is transformed in real-time to cents/Million BTU bids. The transformed cents/Million BTU bids are used to compare submitted bids. The transformation process can be performed in either the server component or the client component.

In one embodiment, the system of the present invention uses such a transformation process to rank bids. In this embodiment, the bids are ranked by the buyer comparative bid parameter. In another embodiment, the relative attractiveness of competing bids is based upon the relative values of the prices offered by the participating bidders and no transformation is required. As is obvious to one skilled in the art, there can be many different methods of ranking bids in the present invention.

Figure 6:
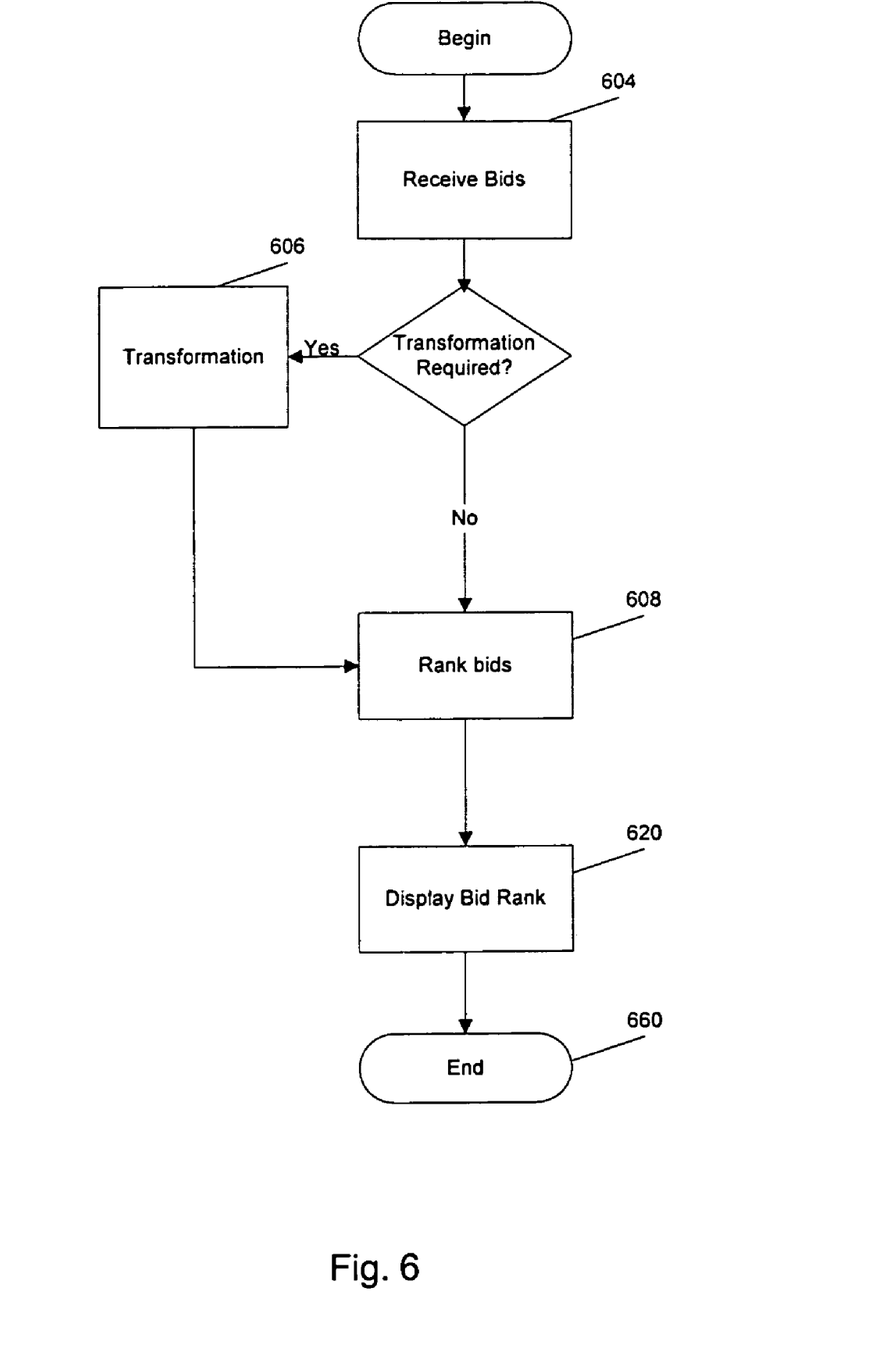
FIG. 6 illustrates a disguised bidding ordering process that includes a transformation function.

As shown in FIG. 6, the disguised price ordering process of the present invention begins at step 604 when the auction coordinator receives a bid. At step 606, transformation occurs, if necessary. At step 608, the bids are ranked in order from most attractive bid to least attractive bid. Alternatively, although not shown in FIG. 6, if a transformation is required, the transformation algorithm may perform the ranking.

The ordinal rank is reported back to the bidder in step 620. Step 660 represents the end, although another bid received can start the whole cycle at step 604 again.

The disguised bidding process of the present invention also can be advantageously used in conducting an interactive bidding event in multiple currencies. Multi-currency bidding is described in co-pending U.S. Application No. 09/282,158, entitled "Method and System for Conducting Electronic Auctions with Multi-Currency Bidding," filed Mar. 31, 1999, the disclosure of which is hereby expressly incorporated in the present application. In an online interactive bidding event incorporating multi-currency bidding, the number of different currencies that may be supported is virtually unlimited. Further, the multi-currency transformation can be configured to assign a fixed penalty of bids in certain currencies, reflecting the costs of banking transactions to exchange into the desired currency. In a multi-currency interactive bidding event with disguised pricing, the bidders only see the ordinal rank of their bids, no matter which to currency was the bid.

In a preferred embodiment, the disguised bidding ordering process is implemented in the auction server component, and can be performed in whole or in part upon the receipt of each additional bid. In a preferred embodiment, ordinal ranks are transmitted to the client component of participating suppliers for display in a supplier user interface.

In an alternative embodiment, elements of the disguised bidding ordering process are implemented by the client component upon receipt of the appropriate bidding parameters (e.g., price and quantity values) for bids submitted by all competing suppliers. As is apparent to one skilled in the art, there are many implementations for performing the ranking by either component.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward-price, supplier-bidding auctions, the principals can be equally applied to upward-price, buyer-bidding auctions. Thus, it is intended that the present invention cover the modifications and variations of this invention provided they come within the scope of the appended claims and their equivalents.

What is claimed is:

1. A method of conducting an electronic online auction between a plurality of bidders, comprising:
   (a) receiving a plurality of bids from bidders;
   (b) determining, using a computer, a rank for each bid in the plurality of bids; and
   (c) for each bid, displaying the rank determined in (b) to the bidder who made the bid, and not displaying the value of any other bids;
   wherein (a) comprises receiving a bid price in a base currency, wherein said bid price is originally defined in a local currency of said first bidder.

2. The method of claim 1, wherein the ranking in (b) determines an ordinal rank for each bid that is displayed to the bidder in (c).

3. The method of claim 1, wherein (b) comprises ranking bids in accordance with the price of the bids.

4. The method of claim 1, further comprising transforming a bidder comparative bid parameter into a comparative bid parameter for the originator of the auction.

5. The method of claim 1, further comprising transmitting the rank to the bidder.

6. The method of claim 1, further comprising (b) and (c) as new bids are received.

7. The method of claim 1, wherein (c) comprises displaying a tie rank to the bidder if the ranking in (b) results in a tie.

8. A system for processing the bidding information in an electronic auction amongst a plurality of bidders, comprising:
   an interface configured to receive a plurality of bids from bidders; and
   a processor configured to determine a rank for each bid in the plurality of bids and for each bid, cause the rank to be displayed to the bidder who made the bid, and the value of any other bids to not be displayed;
   wherein the interface is configured to receive a bid price in a base currency, wherein said bid price is originally defined in a local currency of said first bidder.

9. The system of claim 8, wherein ranking bids includes determining an ordinal rank for each bid that is displayed to the bidder.

10. The system of claim 8, wherein ranking bids includes ranking in accordance with the price of the bids.

11. The system of claim 8, wherein the processor is further configured to transform a bidder comparative bid parameter into a comparative bid parameter for the originator of the auction.

12. The system of claim 8, wherein the processor is further configured to transmit the rank to the bidder.

13. The system of claim 8, wherein the communication interface is further configured to receive and rank bids as new bids are received.

14. The system of claim 8, wherein displaying the rank comprises displaying a tie rank to the bidder if the ranking results in a tie.

15. A computer program product for conducting an electronic online auction between a plurality of bidders, the computer program product being embodied in a computer readable storage medium and comprising instructions which when executed cause a processor to:
   receive a plurality of bids from bidders;
   determine a rank for each bid in the plurality of bids; and
   for each bid, display the determined rank to the bidder who made the bid, and not display the value of any other bids;
   wherein receiving a plurality of bids comprises receiving a bid price in a base currency, wherein said bid price is originally defined in a local currency of said first bidder.

16. A method of conducting an electronic online auction between a plurality of bidders, comprising:
   (a) receiving a plurality of bids from bidders;
   (b) determining, using a computer, a rank for each bid in the plurality of bids; and
   (c) for each bid, displaying the rank determined in (b) to the bidder who made the bid, and not displaying the value of any other bids;
   wherein displaying the rank comprises displaying a tie rank to the bidder if the ranking results in a tie.

17. The method of claim 16, wherein the ranking in (b) determines an ordinal rank for each bid that is displayed to the bidder in (c).

18. The method of claim 16, wherein (b) comprises ranking bids in accordance with the price of the bids.

19. The method of claim 16, further comprising transforming a bidder comparative bid parameter into a comparative bid parameter for the originator of the auction.

20. The method of claim 16, wherein (a) comprises receiving transformed bid information.

21. The method of claim 20, wherein (a) comprises receiving a bid price in a base currency, wherein said bid price is originally defined in a local currency of said first bidder.

22. The method of claim 1, further comprising transmitting the rank to the bidder.

23. The method of claim 20, further comprising (b) and (c) as new bids are received.

24. A system for processing the bidding information in an electronic auction amongst a plurality of bidders, comprising:
   an interface configured to receive a plurality of bids from bidders;
   a processor configured to determine a rank for each bid in the plurality of bids; and
   for each bid, cause the rank to be displayed to the bidder who made the bid, and the value of any other bids to not be displayed;
   wherein displaying the rank comprises displaying a tie rank to the bidder if the ranking results in a tie.

25. The system of claim 24, wherein ranking bids includes determining an ordinal rank for each bid that is displayed to the bidder.

26. The system of claim 24, wherein ranking bids includes ranking in accordance with the price of the bids.

27. The system of claim 24, wherein the processor is further configured to transform a bidder comparative bid parameter into a comparative bid parameter for the originator of the auction.

28. The system of claim 24, wherein receiving bids comprises receiving a bid price in a base currency, wherein said bid price is originally defined in a local currency of said first bidder.

29. The system of claim 24, wherein the processor is further configured to transmit the rank to the bidder.

30. The system of claim 24, wherein the communication interface is further configured to receive and rank bids as new bids are received.

31. The system of claim 24, wherein displaying the rank comprises displaying a tie rank to the bidder if the ranking results in a tie.

32. A computer program product for conducting an electronic online auction between a plurality of bidders, the computer program product being embodied in a computer readable storage medium and comprising instructions which when executed cause a processor to:
   (a) receive a plurality of bids from bidders;
   (b) determine a rank for each bid in the plurality of bids; and
   (c) for each bid, display the determined rank to the bidder who made the bid, and not display the value of any other bids
   wherein (c) comprises displaying a tie rank to the bidder if the ranking in (b) results in a tie.

* * * * *